(12) United States Patent
Richardson et al.

(10) Patent No.: US 11,285,826 B2
(45) Date of Patent: Mar. 29, 2022

(54) VEHICLE ELECTRICAL CHARGING SYSTEM AND METHOD

(71) Applicant: Jaguar Land Rover Limited, Coventry (GB)

(72) Inventors: Mike Richardson, Coventry (GB); Luke Dowell, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 320 days.

(21) Appl. No.: 16/189,573

(22) Filed: Nov. 13, 2018

(65) Prior Publication Data

US 2019/0181587 A1 Jun. 13, 2019

(30) Foreign Application Priority Data

Dec. 8, 2017 (GB) ...................................... 1720483

(51) Int. Cl.
*H02J 7/00* (2006.01)
*B60L 53/16* (2019.01)
(Continued)

(52) U.S. Cl.
CPC ............... *B60L 53/16* (2019.02); *B60K 28/10* (2013.01); *B60W 10/08* (2013.01);
(Continued)

(58) Field of Classification Search
CPC ..................................................... B60L 53/16
(Continued)

(56) References Cited

U.S. PATENT DOCUMENTS

| 5,548,200 A | * | 8/1996 | Nor | ...................... | H02J 7/00036 |
|---|---|---|---|---|---|
| | | | | | 320/109 |
| 2009/0288896 A1 | * | 11/2009 | Ichikawa | ............... | B60K 6/365 |
| | | | | | 180/65.265 |

(Continued)

FOREIGN PATENT DOCUMENTS

| DE | 10 2008 039 955 A1 | 3/2010 |
|---|---|---|
| DE | 10 2010 054 464 A1 | 6/2011 |
| GB | 2501727 A | 11/2013 |

OTHER PUBLICATIONS

Search Report and English language translation, DE Application No. 10 2018 219 908.6, dated Jan. 29, 2020, 23 pp.

(Continued)

*Primary Examiner* — Yalkew Fantu
(74) *Attorney, Agent, or Firm* — McCoy Russell LLP (57) ABSTRACT

A vehicle electrical charging system includes a charging socket arranged to receive a charging plug and a detector arranged to infer whether the charging plug is plugged into the charging socket and output a detection signal indicative of whether the charging plug is plugged into the charging socket. The vehicle charging system includes a controller that outputs a control signal to control one or more of the vehicle systems to prevent the vehicle from entering or maintaining a condition whereby the vehicle is moveable under its own power or weight in dependence on the detection signal indicating that the charging plug is plugged into the charging socket. The controller overrides the prevention in dependence on a blocking body being in a first configuration, where the blocking body is arranged, when in the first configuration, to prevent the action of plugging the charging plug into the charging socket.

19 Claims, 2 Drawing Sheets

(51) Int. Cl.
  *B60K 28/10*    (2006.01)
  *B60W 10/08*    (2006.01)
  *H01R 13/639*   (2006.01)
  *H01R 13/66*    (2006.01)
  *B60L 53/18*    (2019.01)

(52) U.S. Cl.
  CPC ....... *H01R 13/639* (2013.01); *H01R 13/6683* (2013.01); *B60L 53/18* (2019.02); *B60L 2250/12* (2013.01); *H01R 2201/26* (2013.01)

(58) Field of Classification Search
  USPC ....................................................... 320/109
  See application file for complete search history.

(56) References Cited

U.S. PATENT DOCUMENTS

| | | | |
|---|---|---|---|
| 2010/0320018 A1* | 12/2010 | Gwozdek ............ | B60W 10/182 180/65.27 |
| 2011/0178663 A1 | 7/2011 | Crombez | |
| 2014/0176070 A1* | 6/2014 | Krammer ................ | B60L 53/66 320/109 |
| 2015/0066257 A1 | 3/2015 | Ochocinski et al. | |
| 2019/0066416 A1* | 2/2019 | Dhillon ................... | G07C 9/37 |

OTHER PUBLICATIONS

Patents Act 1977: Combined Search and Examination Report under Sections 17 and 18(3), UKIPO Application No. GB1720483.5, dated Jun. 8, 2018, 5 pp.

\* cited by examiner

VEHICLE ELECTRICAL CHARGING SYSTEM AND METHOD

CROSS-REFERENCE TO RELATED APPLICATION

This application claims priority under 35 U.S.C. § 119 to Great Britain Application No. 1720483.5, filed Dec. 8, 2017, the content of which is incorporated herein by reference in its entirety.

TECHNICAL FIELD

The present disclosure relates to a vehicle electrical charging system and method. Aspects of the invention relate to a vehicle electrical charging system, to a controller, to a vehicle, to a method of operating a vehicle, to a computer program, to a non-transitory computer readable storage medium and to a signal.

BACKGROUND

Various vehicles, such as plug-in-hybrid vehicles and battery electric vehicles may be charged through suitable connection with a vehicle charging point. Typically a charging plug is provided on a vehicle charging point and a charging socket is provided on the vehicle.

Where the charging plug is plugged into the charging socket, it is desirable that the vehicle be prevented from moving under its own power or weight. Without such prevention damage to the vehicle and/or vehicle charging point may occur (e.g. as resulting from uncontrolled and/or unintended unplugging). Therefore conventional vehicles are designed to immobilise themselves where the charging plug is detected as plugged into the charging socket.

Nonetheless there are instances where detection that the charging plug is plugged into the charging socket may be spurious. It may be for instance that liquid (e.g. water) ingress into the charging socket (and in particular a detector for detecting the charging plug) may lead to a false detection of the charging plug. Such difficulties may be encountered more often in vehicles designed to wade through bodies of water. A further example of a potentially spurious cause for detection of a charging plug may arise for nefarious reasons (e.g. the placement plugging a dummy plug into the charging socket with a view to immobilising the vehicle).

It is therefore desirable that a vehicle electrical charging system is better able to distinguish spurious detection of a charging plug being plugged into a charging socket in order to avoid unnecessary and/or inconvenient vehicle immobilisation.

It is an object of embodiments of the invention to at least mitigate one or more of the problems of the prior art.

SUMMARY OF THE INVENTION

Aspects and embodiments of the invention provide a vehicle electrical charging system, a controller, a vehicle, a method of operating a vehicle, a computer program, a non-transitory computer readable storage medium and a signal as claimed in the appended claims.

According to an aspect of the invention there is provided a vehicle electrical charging system comprising a charging socket arranged to receive a charging plug and a detector means arranged to infer whether the charging plug is plugged into the charging socket and output a detection signal indicative of whether the charging plug is plugged into the charging socket, and where the vehicle charging system comprises a controller arranged to output a control signal to control one or more of the vehicle systems to prevent the vehicle from entering or maintaining a condition whereby the vehicle is moveable under its own power or weight in dependence on the detection signal indicating that the charging plug is plugged into the charging socket.

According to another aspect of the invention there is provided a vehicle electrical charging system comprising a charging socket arranged to receive a charging plug and a detector means arranged to infer whether the charging plug is plugged into the charging socket and output a detection signal indicative of whether the charging plug is plugged into the charging socket, and where the vehicle charging system comprises a controller arranged to output a control signal to control one or more of the vehicle systems to prevent the vehicle from entering or maintaining a condition whereby the vehicle is moveable under its own power or weight in dependence on the detection signal indicating that the charging plug is plugged into the charging socket and where the controller is arranged to override the prevention in dependence on a blocking body being in a first configuration, where the blocking body is arranged, when in the first configuration, to prevent the action of plugging the charging plug into the charging socket.

Immobilisation of the vehicle where the detection signal indicates that the charging plug is plugged into the charging socket may be desirable in order to prevent damage to the vehicle and or charging apparatus. Nonetheless, where the blocking body is in the first configuration, it may be inferred that the charging plug is not in fact present, and that its indicated presence is the consequence of a false alarm. Such false alarms might for instance occur due to a wet charging socket (perhaps as a result of vehicle wading), or use of a dummy charging plug inserted for nefarious purposes. In such circumstances, and despite the detection signal continuing to indicate that the charging plug is plugged into the charging socket, the override means that the vehicle is not prevented from moving under its own power and/or weight.

As will be appreciated the override may occur before or after prevention has been instigated. Further, override may constitute simply not preventing (e.g. the absence of the prevention), rather necessarily than the countermanding of an instigated or as yet un-instigated prevention. Thus the override may be considered an exception to a standard response to the detection signal indicating that the charging plug is plugged into the charging socket In some embodiments the detector means comprises a detector arranged to infer whether the charging plug is plugged into the charging socket and output a detection signal indicative of whether the charging plug is plugged into the charging socket. Such a detector may for instance be an electrical resistance detector, an electrical switch or an electrical pressure sensor.

In some embodiments the charging socket is arranged to be installed on the vehicle. In alternative embodiments the charging socket is arranged to be installed at a charging point. In the latter case the charging plug may be arranged to be installed on the vehicle.

In some embodiments the vehicle electrical charging system is arranged to be installed on the vehicle.

In some embodiments, the controller infers that the blocking body is in the first configuration in accordance with the vehicle operating condition and/or the configuration of one or more of the vehicle systems indicative of the configuration of the blocking body. It may be for instance that deployment of the blocking body to the first configuration is performed when the vehicle systems are configured to permit the vehicle to move under its own power or weight, or where the vehicle reaches a predetermined speed. Additionally or alternatively, the vehicle electrical charging system may comprise a blocking body sensor which sends a blocker signal to the controller indicative of whether the blocking body is in the first configuration.

In some embodiments, when in the first configuration, the blocking body is arranged to lock the charging plug plugged into the charging socket to prevent its removal. This may mean that the blocking body performs an additional function, (i.e. retention of the inserted charging plug) which may be efficient. Nonetheless it may imply that the blocking body being in the first configuration is not reliably deterministic of the absence of the charging plug from the charging socket. Specifically, the blocking body being in the first configuration may imply that the charging plug is not plugged into the charging socket or that a charging plug is plugged into the charging socket and is secured there. Thus, in such embodiments, it may be desirable for there to be one or more additional criteria which should be met before the controller overrides the prevention of the vehicle entering or maintaining a condition whereby it can move under its own power or weight.

In some embodiments, override of the prevention is dependent on the vehicle systems being configured to permit the vehicle to move under its own power or weight. This, in combination with the blocking body being in the first configuration may be deterministic of there being no charging plug plugged into the charging socket. It may be for instance that the blocking body being in the first configuration can only occur where there is no charging plug plugged into the charging socket, or else where a charging plug is plugged into the charging socket and is secured there by the blocking body. Further, it may be that in the latter case, the controller prevents the vehicle from entering or maintaining a condition whereby it can move under its own power or weight. Thus where the controller is configured to permit the vehicle to move under its own power or weight and the blocking body is in the first configuration, it may be inferred that it is not possible for a charging plug to be plugged into the charging socket. Thus, in such circumstances, where the detection signal nonetheless indicates that a charging plug is plugged into the charging socket, it may be that the controller overrides the prevention (and the inference of the detection signal is effectively therefore ignored). Knowledge that the vehicle is in a condition whereby it can move under its own power or weight may be based on sensing or alternative determination of the condition of the vehicle and/or its systems. It may be for instance that the vehicle is determined to be in a condition whereby it can move under its own power or weight in accordance with a transmission selection or the condition of a braking system of the vehicle.

In some embodiments a determination that the vehicle systems are configured to permit the vehicle to move under the vehicle's own power or weight is made in accordance with a gear selection mechanism being configured in a movement gear or mode or being in a neutral configuration. Thus a determination that the vehicle systems are configured to permit the vehicle to move may for instance be made where a forward gear, reverse gear, drive mode (optionally with sport, snow or other associated mode) or neutral is selected. This may be particularly convenient where the transmission is used by the controller as the mechanism by which it may prevent movement of the vehicle under its own power or weight e.g. by forcing the vehicle into 'park'.

In some embodiments, when in a second configuration, the blocking body allows free passage of the charging plug to allow the actions of plugging in and unplugging from the charging socket.

In some embodiments the detector means is arranged to determine whether the charging plug is plugged into the charging socket in accordance with a resistance measurement that alters in accordance with whether or not the charging plug is plugged into the charging socket. This may be a convenient manner of determining whether or not a charging plug is plugged into the charging socket. Nonetheless it may be somewhat susceptible to false readings where water or other fluids are present on at least part of the detector means.

Therefore the override system as discussed previously may be of particular benefit in combination with such detectors in order that false alarms may be mitigated.

In some embodiments the detector means comprises a first part of an electrical circuit arranged to form a complete circuit with a second part of the electrical circuit only when the charging plug is plugged into the charging socket, and where the detector means comprises a resistance determination means arranged to determine the resistance in the first part of the electrical circuit when the charging plug is not plugged into the charging socket and in the completed electrical circuit when the charging plug is plugged into the charging socket. Because such a system tends to require that an object, (such as a charging plug) specifically arranged to complete the electrical circuit, is required to be plugged in, in order that the detection signal indicates a plugged-in charging plug, the detector means may be less prone to error than alternative detector types.

In some embodiments the vehicle systems comprise one or more of a transmission system, a brake system, a propulsion system, a battery system, an engine, a computer system and a fuel system.

In some embodiments the blocking body is a pin. The pin may be spring loaded and/or may be selectively extendable and retractable.

In some embodiments the controller controls the issue of a driver alert when the override is triggered. This may assist a driver of the vehicle, indicating that, despite the detection signal indicating that a charging plug is plugged into the charging socket, the vehicle can be moved under its own power or weight. Further, it may indicate to the driver that at least part of the vehicle electrical charging system (e.g. the charging socket) should be checked and/or maintained.

In some embodiments the vehicle electrical charging system is arranged for charging a plug-in-hybrid vehicle or a battery electric vehicle.

According to yet another aspect of the invention there is provided a vehicle comprising the vehicle electrical charging system of the previous aspect.

In some embodiments the vehicle is a plug-in-hybrid vehicle or a battery electric vehicle.

According to a further aspect of the invention, a controller for a vehicle electrical charging system, where the vehicle electrical charging system comprises a charging socket arranged to receive a charging plug and a detector means arranged to infer whether the charging plug is plugged into the charging socket and output a detection signal indicative of whether the charging plug is plugged into the charging socket, where the controller comprises:

an input means arranged to receive the detection signal;

an output means arranged to output a control signal to control one or more of the vehicle systems to prevent the vehicle from entering or maintaining a condition whereby the vehicle is movable under its own power or weight; and a control means arranged to control the output means to output the control signal in dependence on the detection signal indicating that the charging plug is plugged into the charging socket and to override output of the control signal where a blocking body is in a first configuration, where the blocking body is arranged, when in the first configuration, to prevent the action of plugging the charging plug into the charging socket.

In some embodiments the input means comprises an electrical input for receiving the detector signal, the output means comprises an electrical output for outputting the control signal and the control means comprises one or more control devices such as electronic processing devices.

According to a still further aspect of the invention there is provided a method of operating a vehicle comprising an electrical charging system, the method comprising:

i) inferring whether a charging plug is plugged into a charging socket of the electrical charging system;

ii) controlling one or more of the vehicle systems to prevent the vehicle from entering or maintaining a condition whereby the vehicle is moveable under its own power or weight in dependence on the charging plug being inferred to be plugged into the charging socket;

iii) overriding the prevention in dependence on a blocking body being in a first configuration, where the blocking body is arranged, when in the first configuration, to prevent the action of plugging the charging plug into the charging socket.

In some embodiments the method comprises inferring that the blocking body is in the first configuration in accordance with the vehicle operating condition and/or the configuration of one or more of the vehicle systems indicative of the configuration of the blocking body.

In some embodiments overriding the prevention is dependent on the vehicle systems being configured to permit the vehicle to move under its own power or weight.

In some embodiments a determination that the vehicle systems are configured to permit the vehicle to move under the vehicle's own power or weight is made in accordance with a gear selection mechanism being configured in a movement gear or mode or being in a neutral configuration.

In some embodiments the method comprises issuing of a driver alert when the override is triggered.

According to a still further aspect of the invention there is provided a computer program that, when read by a computer, causes performance of the method.

According to a still further aspect of the invention there is provided a non-transitory computer readable storage medium comprising computer readable instructions that, when read by a computer, cause performance of the method.

According to a still further aspect of the invention there is provided a signal comprising computer readable instructions that, when read by a computer, cause performance of the method.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
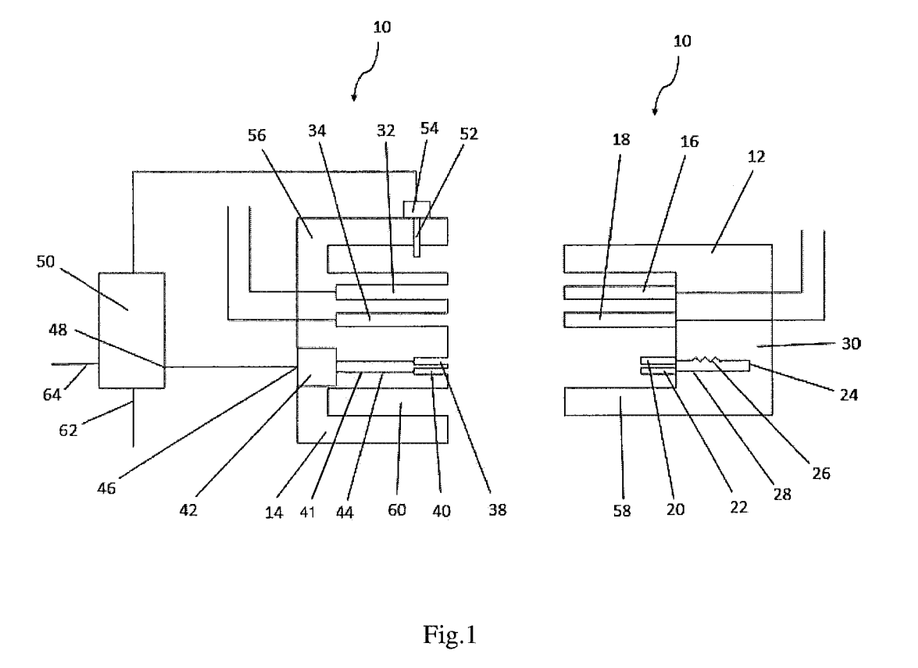
FIG. 1 shows a schematic cross-sectional view of a vehicle electrical charging system according to an embodiment of the invention.

Referring first to FIG. 1, a vehicle electrical charging system is generally shown at 10. The system 10 has a charging plug 12 and a charging socket 14.

The charging plug 12 has positive 16 and negative 18 charging pins which are connected to corresponding polarities of a charging electrical power source (not shown) via a vehicle charging point (not shown).

The charging plug 12 also has positive 20 and negative 22 detector pins which are connected by wiring 24 and a resistor 26. The positive 20 and negative 22 detector pins, wiring 24 and resistor 26 together form a first part 28 of a detector electrical circuit which itself forms part of a detector (described in more detail below).

The positive 20 and negative 22 detector pins and the first part 28 of the detector electrical circuit are supported and positioned relative to each other by a charging plug casing 30.

Figure 2:
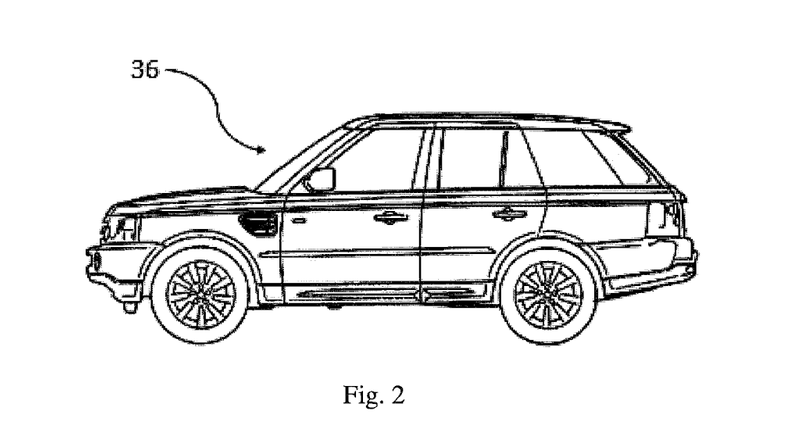
FIG. 2 shows a perspective view of a vehicle in accordance with an embodiment of the invention.

The charging socket 14 has positive 32 and negative 34 charging terminals which are connected to corresponding polarities of an electrical power storage device (not shown) of a vehicle 36 (see FIG. 2). In this embodiment the electrical power storage device is a battery.

The charging socket 14 also has positive 38 and negative 40 detector terminals which are connected by wiring 41, a detector electrical power source (not shown) and a resistance determination means (in this case a resistance detector 42). The positive 38 and negative 40 detector terminals, wiring 41, detector electrical power source and resistance detector 42 form a second part 44 of the detector electrical circuit. The resistance detector 42 has a detection output 46 via which it transmits a detection signal indicative of the resistance encountered by the second part 44 of the detector electrical circuit to an input means (in this case a detection input 48) of a controller 50.

The charging socket 14 also has a blocking body (in this case a pin 52) and an actuator 54. The actuator 54 is controlled by the controller 50 for selective actuation of the pin 52 between a first configuration, in this case an extended blocking position (as shown in FIG. 1) and a second configuration, in this case a retracted access configuration.

The positive 32 and negative 34 charging terminals, the second part 44 of the detector electrical circuit and the pin 52 and actuator 54 are supported and positioned relative to each other by a charging socket casing 56.

The charging plug 12 is arranged to be plugged into the charging socket 14. Given correct orientation of the charging plug 12 and charging socket 14 with respect to each other, the positive 16 and negative 18 charging pins are respectively aligned with the positive 32 and negative 34 charging terminals. The positive 32 and negative 34 charging terminals are arranged to receive the respective positive 16 and negative 18 charging pins in this alignment. Given that same orientation of the charging plug 10 and charging socket 14, positive 20 and negative 22 detector pins are respectively aligned with the positive 38 and negative 40 detector terminals. The positive 38 and negative 40 detector terminals are arranged to receive the respective positive 20 and negative 22 detector pins in this alignment. Given that same orientation of the charging plug 12 and charging socket 14, a male mating formation 58 of the charging plug casing 30, is aligned with a female mating formation 60 of the charging socket casing 56 and the female mating formation 60 is arranged to receive the male mating formation 58.

When in the extended blocking position, the pin 52 extends into the female mating formation 60, thereby preventing the plugging of the charging plug 12 into the charging socket 14.

The charging socket 14 and controller 50 are mounted on the vehicle 36.

The controller 50 has a further input in the form of a vehicle system notification input 62. The controller 50 also has an output means (in this case a vehicle system control output 64) and a control means (not shown).

In use the electrical charging system 10 may be used to charge the battery of the vehicle 36, which is a plug-in-hybrid vehicle where the battery is used to contribute to the driving force applied to the vehicle 36 wheels. It will be appreciated that in other embodiments the vehicle 36 may for example be a battery electric vehicle.

In a particular scenario, the vehicle 36 may be located nearby to the vehicle charging point and a user may shift a gear selection mechanism e.g. a transmission system of the vehicle 36 to 'park'. The controller 50 receives a signal from a transmission controller of the vehicle 36 via the vehicle system notification input 62 that the transmission system is in 'park'. In response the controller 50 controls the actuator 54 to retract the pin 52 into its access configuration. Thus a user may then insert the charging plug 12 into the charging socket 14. The user may properly align the charging plug 12 and charging socket 14 and plug the former into the latter.

With the charging plug 12 plugged into the charging socket 14, and specifically the positive 20 and negative 22 detector pins respectively plugged into the positive 38 and negative 40 detector terminals, the first 28 and second 44 parts of the detector electrical circuit are combined to form a complete detector circuit. Furthermore, the resistance measured by the resistance detector 42 will decrease, and a detection signal to this effect, inferring that the charging plug 12 is plugged into the charging socket 14, is sent from the resistance detector 42 to the controller 50 via the detection output 46 and detection input 48. In response, the controller 50 sends a control signal to the transmission controller via the vehicle system control output 64. The control signal sent from the controller 50 indicates to the transmission controller that no change to the transmission state is to be permitted (i.e. the transmission system should remain in 'park'). In this way the controller 50 controls the transmission system to prevent the vehicle 36 from entering a condition whereby it can move under its own power or weight. The controller 50 may therefore be considered to immobilise the vehicle 36.

In addition, the controller 50 controls the actuator 54 to extend the pin 52 into its blocking position. In this way the charging plug 12 is locked into the charging socket 14, because the pin 52 enters a cooperating recess (not shown) in the charging plug casing 30.

With the charging plug 12 plugged into the charging socket 14, and specifically the positive 16 and negative 18 charging pins respectively plugged into positive 32 and negative 34 charging terminals, electrical power flows from the charging electrical power source to the battery of the vehicle 36.

Upon completion of the charging operation a user may instruct that the controller 50 controls the actuator 54 to retract the pin 52 into its access configuration, thereby allowing the user to unplug the charging plug 12 from the charging socket 14. The controller 50 is alerted to the charging plug 12 being unplugged from the charging socket 14, by the detection circuit. Specifically the resistance measured by the resistance detector 42 will increase, and a detection signal to this effect, inferring that the charging plug 12 is unplugged, is sent from the resistance detector 42 to the controller 50 via the detection output 46 and detection input 48.

In response the controller 50 controls the actuator 54 to extend the pin 52 into its blocking position. In this way the plugging of a charging plug into the charging socket 14 is prevented. Further, the controller 50 sends a control signal to the transmission controller via the vehicle system control output 64. The control signal sent from the controller 50 indicates to the transmission controller that the transmission state may be changed from 'park'. In this way the controller 50 controls the transmission system to allow the vehicle 36 to enter a condition whereby it can move under its own power or weight.

Thereafter a user may adjust the transmission system out of 'park' to an alternative state (e.g. 'drive', 'reverse', 'neutral' or 'sport'). At some time after such an adjustment, it may be that the resistance detector 42 sends a detection signal to the controller 50 via the detection output 46 and detection input 48, inferring that the charging plug 12 is plugged into the charging socket 14. Were this to occur after the user had adjusted the transmission system back to 'park', the controller 50 would respond accordingly as described above, including sending a control signal to the transmission controller via the vehicle system control output 64 indicating to the transmission controller that no change to the transmission state is to be permitted.

Where however the signal received by the controller 50 from the transmission controller does not indicate that the transmission system is in 'park', the controller 50 does not send a control signal to the transmission controller indicating that no change to the transmission state is to be permitted. In this way the user may continue to change the transmission state and the vehicle 36 can remain and/or be placed in a condition whereby it can move under its own power or weight. The controller 50 thereby overrides its normal sending of a control signal to the transmission controller in response to a charging plug 12 plugged in detection. Specifically the controller 50 does not send such a control signal indicating that no change to the transmission state is to be permitted. It overrides the sending of this control signal in dependence on the transmission system being configured to permit the vehicle 36 to move under its own power or weight and in dependence on the pin 52 being in in its extended blocking position (which in this case is inferred in view of the transmission system not being in 'park').

The reason for the controller 50 override is because the controller 50 infers that, despite the detection signal sent from the resistance detector 42 to the controller 50 inferring that the charging plug 12 is plugged into the charging socket 14, that there is no charging plug plugged into the charging socket 13. Such false detection may for instance be caused by vehicle 36 wading or malicious tampering with the charging socket 14. The controller 50 is able to infer that the detection is false because it should not be possible for there to be a charging plug in the charging socket 14, where both the pin 52 is in the extended blocking position and the transmission system is configured to permit the vehicle to enter or maintain a condition whereby it can move under its own power or weight.

Figure 3:
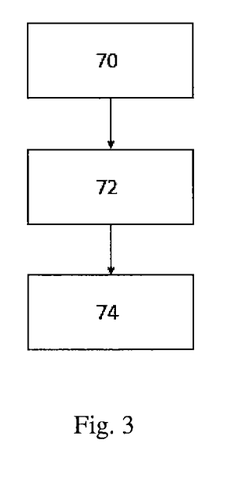
FIG. 3 shows a method steps in accordance with an embodiment of the invention.

Thus in accordance with FIG. 3, the controller 50 may perform a process whereby it:
i) infers in step 70 whether a charging plug is plugged into the charging socket 14 of an electrical charging system;
ii) controls in step 72 the transmission system of the vehicle 36 to prevent the vehicle 36 from entering or maintaining a condition whereby the vehicle is moveable under its own power or weight when the charging plug is inferred to be plugged into the charging socket 14;
iii) overrides in step 74 the prevention in dependence on the pin 52 being in its extended blocking position and the transmission system being configured to permit the vehicle to enter or maintain a condition whereby the vehicle is moveable under its own power or weight.

Where the controller 50 overrides its sending of a control signal to the transmission controller indicating that no change to the transmission state is to be permitted, it also controls the issue of a driver alert in the form of an in vehicle visual and audio notification.

As will be appreciated, various modifications from the embodiment described above are possible. By way of example, different parts of the vehicle electrical charging system may be installed on the vehicle 36 and/or vehicle charging point (e.g. the charging plug 12 may be installed on the vehicle 36 and the charging socket 14 on the charging point). In such an arrangement, the pin 52, actuator 54, and controller 50 are installed on the vehicle. The charging plug 12 comprises the pin 52, where the pin 52 is configured to provide the functionality as described above. That is, the pin 52 can, at least, block insertion of the charging plug 12 into the charging socket 14. The charging plug 12 may also comprise the controller 50, or the controller 50 may be located elsewhere in the vehicle 36.

In such a modified arrangement, the vehicle 36 also comprises the detector means. The detector means is arranged such that the vehicle 36 comprises the resistance detector 42. In some arrangements the charging plug 12 may comprise the resistance detector 42. The first part 28 of the detector electrical circuit described above may be located in the charging socket 14 and the second part 44 of the detector electrical circuit described above may be located in the charging plug 12.

The positive 20 and negative 22 detector pins described above as part of the first part 28 of the detector electrical circuit may be replaced with positive and negative detector terminals when located in the charging socket 14. The positive 32 and negative 34 charging terminals described above as part of the second part 44 of the detector electrical circuit may be replaced with positive and negative detector pins when located in the charging plug 12. Thus the charging plug 12 and charging socket 14 may both retain their arrangement of pins and terminals as described above in relation to the arrangement of FIG. 1. The resistance detector 42 may be arranged with a detection output 46, via which it transmits a detection signal indicative of the resistance encountered, as described above in relation to FIG. 1.

By way of further example, control over whether or not the vehicle 36 is permitted to enter or maintain a condition whereby it can move under its own power or weight may be exerted by means other than or additional to the transmission system. The controller 50 could for instance control a braking system, a propulsion system, a battery system, an engine, a computer system a fuel system and/or an ignition system of the vehicle 36. Furthermore, the controller's 50 control over retraction and extension of the pin 52 need not be based on the configuration of the vehicle 36 transmission and/or whether or not the charging plug 12 is detected as being plugged into the charging socket 14. It may be for instance that extension and/or retraction of the pin 52 is based at least in part on vehicle 36 speed and/or the condition of one or more other vehicle systems. In some cases it may be possible to plug the charging plug 12 into the charging socket 14 even when the vehicle 36 is in a condition whereby it can move under its own power or weight (i.e. because the pin 52 may not be extended simply because the vehicle 36 is in that condition). In such cases the controller 50 may prevent the vehicle 36 from maintaining that condition once the charging plug 12 is detected as plugged into the charging socket 14, unless the relevant override condition applies (e.g. that additionally the pin 52 is in the extended blocking position). It may also be that, rather than the position of the pin being inferred, its position is sensed and a signal indicative of its position is sent to the controller 50.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A vehicle electrical charging system, comprising:
a charging socket arranged to receive a charging plug;
a detector arranged to infer whether the charging plug is plugged into the charging socket and output a detection signal indicative of whether the charging plug is plugged into the charging socket; and
a controller arranged to:
output a control signal to control one or more vehicle systems to prevent the vehicle from entering or maintaining a condition whereby the vehicle is moveable under its own power or weight in dependence on the detection signal indicating that the charging plug is plugged into the charging socket, and
override the prevention in dependence on a blocking body being in a first configuration when the detection signal indicating that the charging plug is plugged into the charging socket is output by the detector, where the blocking body is arranged, when in the first configuration, to prevent the action of plugging the charging plug into the charging socket.

2. The vehicle electrical charging system according to claim 1, wherein the charging socket is arranged on the vehicle.

3. The vehicle electrical charging system according to claim 1, wherein the charging socket is arranged at a charging point.

4. The vehicle electrical charging system according to claim 1, wherein the controller infers that the blocking body is in the first configuration in accordance with the vehicle condition and/or a configuration of the one or more vehicle systems indicative of the configuration of the blocking body.

5. The vehicle electrical charging system according to claim 1, wherein, when in the first configuration, the blocking body is arranged to lock the charging plug plugged into the charging socket to prevent its removal.

6. The vehicle electrical charging system according to claim 1, wherein override of the prevention is dependent on the one or more vehicle systems being configured to permit the vehicle to move under its own power or weight.

7. The vehicle electrical charging system according to claim 6, wherein a determination that the one or more vehicle systems are configured to permit the vehicle to move under the vehicle's own power or weight is made in accordance with a gear selection mechanism being configured in a movement gear or mode or being in a neutral configuration.

8. The vehicle electrical charging system according to claim 1, wherein, when in a second configuration, the blocking body allows free passage of the charging plug to allow the actions of plugging in and unplugging from the charging socket.

9. The vehicle electrical charging system according to claim 1, wherein the detector is arranged to determine whether the charging plug is plugged into the charging socket in accordance with a resistance measurement that alters in accordance with whether or not the charging plug is plugged into the charging socket.

10. The vehicle electrical charging system according to claim 9, wherein the detector comprises a first part of an electrical circuit arranged to form a complete circuit with a second part of the electrical circuit only when the charging plug is plugged into the charging socket, and wherein the detector comprises a resistance detector arranged to determine a resistance in the first part of the electrical circuit when the charging plug is not plugged into the charging socket and in the completed electrical circuit when the charging plug is plugged into the charging socket.

11. The vehicle electrical charging system according to claim 1, wherein the one or more vehicle systems comprise one or more of a transmission system, a brake system, a propulsion system, a battery system, an engine, a computer system and a fuel system.

12. The vehicle electrical charging system according to claim 1, wherein the blocking body is a pin.

13. The vehicle electrical charging system according to claim 1, wherein the controller issues a driver alert when the override is triggered.

14. The vehicle electrical charging system according to claim 1, wherein the vehicle electrical charging system is arranged for charging a plug-in-hybrid vehicle or a battery electric vehicle.

15. A vehicle comprising the vehicle electrical charging system of claim 1.

16. The vehicle according to claim 15, wherein the vehicle is a plug-in-hybrid vehicle or a battery electric vehicle.

17. A controller for a vehicle electrical charging system, wherein the vehicle electrical charging system comprises a charging socket arranged to receive a charging plug and a detector arranged to infer whether the charging plug is plugged into the charging socket and output a detection signal indicative of whether the charging plug is plugged into the charging socket, wherein the controller comprises:
an electrical input arranged to receive the detection signal;
an electrical output arranged to output a control signal to control one or more vehicle systems to prevent the vehicle from entering or maintaining a condition whereby the vehicle is movable under its own power or weight; and a control device arranged to control the electrical output to output the control signal in dependence on the detection signal indicating that the charging plug is plugged into the charging socket and to override output of the control signal where a blocking body is in a first configuration when the detection signal indicating that the charging plug is plugged into the charging socket is output by the detector, wherein the blocking body is arranged, when in the first configuration, to prevent the action of plugging the charging plug into the charging socket.

18. A method of operating a vehicle comprising an electrical charging system, the method comprising:

inferring whether a charging plug is plugged into a charging socket of the electrical charging system;

controlling one or more vehicle systems to prevent the vehicle from entering or maintaining a condition whereby the vehicle is moveable under its own power or weight in dependence on the charging plug being inferred to be plugged into the charging socket; and overriding the prevention in dependence on a blocking body being in a first configuration when a detection signal indicating that the charging plug is plugged into the charging socket is output, wherein the blocking body is arranged, when in the first configuration, to prevent the action of plugging the charging plug into the charging socket.

19. A non-transitory computer readable storage medium comprising computer readable instructions that, when read by a computer, cause performance of the method of claim 18.

* * * * *